(12) United States Patent
Wan et al.

(10) Patent No.: US 12,541,294 B2
(45) Date of Patent: Feb. 3, 2026

(54) SESSION METHOD AND APPARATUS, ELECTRONIC DEVICE, AND STORAGE MEDIUM

(71) Applicant: Beijing Zitiao Network Technology Co., Ltd., Beijing (CN)

(72) Inventors: Shiqi Wan, Beijing (CN); Yuxuan Zhao, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/806,636

(22) Filed: Aug. 15, 2024

(65) Prior Publication Data

US 2024/0402898 A1  Dec. 5, 2024

Related U.S. Application Data

(63) Continuation of application No. PCT/CN2023/076331, filed on Feb. 16, 2023.

(30) Foreign Application Priority Data

Feb. 18, 2022  (CN) .......................... 202210153210.9

(51) Int. Cl.
G06F 3/048  (2013.01)
G06F 3/04847  (2022.01)

(52) U.S. Cl.
CPC ................................ *G06F 3/04847* (2013.01)

(58) Field of Classification Search
None
See application file for complete search history.

(56) References Cited

U.S. PATENT DOCUMENTS

| 7,133,900 B1 | 11/2006 | Szeto |
| 10,949,616 B1 * | 3/2021 | Shenoy ................. G06F 16/313 |
| 2014/0089436 A1 | 3/2014 | Zhang et al. |

(Continued)

FOREIGN PATENT DOCUMENTS

| CA | 2707575 A | 6/2009 |
| CN | 101360071 A | 2/2009 |

(Continued)

OTHER PUBLICATIONS

China Patent Application No. 202210153210.9; Notice of Registration; dated Jan. 25, 2024; 8 pages.

(Continued)

*Primary Examiner* — Tuan S Nguyen
(74) *Attorney, Agent, or Firm* — BakerHostetler

(57) ABSTRACT

Embodiments of the present disclosure disclose a session method and apparatus, an electronic device, and a storage medium. The method is applied to a client of a first user, and includes: receiving, on a session interface, a preset message transmitted by a second user, the preset message being configured to trigger displaying an entrance for setting a preset function; in response to the fact that the entrance for setting the preset function is triggered, displaying a region for setting the preset function; and in response to a setting operation for a preset function in the region for setting the preset function, setting the preset function of a client of a first user.

19 Claims, 8 Drawing Sheets receiving, on a session interface, a preset message sent from a second user, the preset message being configured to trigger displaying an entrance for setting a preset function — 110 in response to the entrance for setting the preset function being triggered, displaying a region for setting the preset function — 120 in response to a setting operation for a preset function in the region for setting the preset function, setting the preset function of the client of the first user — 130

(56) References Cited

U.S. PATENT DOCUMENTS

| | | | |
|---|---|---|---|
| 2015/0058060 A1* | 2/2015 | Tao | G06Q 10/1095 |
| | | | 705/7.19 |
| 2017/0324684 A1 | 11/2017 | Dharmapalan et al. | |
| 2017/0339085 A1 | 11/2017 | Judd et al. | |
| 2018/0084079 A1* | 3/2018 | Williams | H04W 4/00 |
| 2018/0331996 A1 | 11/2018 | Zhang et al. | |
| 2018/0358008 A1 | 12/2018 | Johnson, Jr. et al. | |
| 2018/0367484 A1 | 12/2018 | Rodriguez et al. | |
| 2020/0351374 A1 | 11/2020 | Eberle et al. | |
| 2021/0056514 A1 | 2/2021 | Jain et al. | |
| 2022/0182797 A1* | 6/2022 | Gutierrez | G06F 3/0481 |
| 2024/0420109 A1 | 12/2024 | Van Os et al. | |

FOREIGN PATENT DOCUMENTS

| | | |
|---|---|---|
| CN | 102082855 A | 6/2011 |
| CN | 102833189 A | 12/2012 |
| CN | 103067490 A | 4/2013 |
| CN | 103188314 A | 7/2013 |
| CN | 104391858 A | 3/2015 |
| CN | 106254784 A | 12/2016 |
| CN | 106527895 A | 3/2017 |
| CN | 106878154 A | 6/2017 |
| CN | 106940674 A | 7/2017 |
| CN | 110430123 A | 11/2019 |
| CN | 110581794 A | 12/2019 |
| CN | 112748966 A | 5/2021 |
| CN | 113569037 A | 10/2021 |
| CN | 113872851 A | 12/2021 |
| CN | 114003326 A | 2/2022 |
| CN | 114527925 A | 5/2022 |
| EP | 3800837 A1 | 4/2021 |
| JP | 6983261 B2 | 12/2021 |
| KR | 2015-0105025 A | 9/2015 |
| KR | 2019-0136080 A | 12/2019 |
| WO | WO 2011/063647 A1 | 6/2011 |
| WO | WO 2020/221228 A1 | 11/2020 |
| WO | WO 2021/228166 A1 | 11/2021 |

OTHER PUBLICATIONS

China Patent Application No. 202210153210.9; First Office Action; dated Jul. 21, 2023; 28 pages.

China Patent Application No. 202210153210.9; Second Office Action; dated Nov. 17, 2023; 32 pages.

International Patent Application No. PCT/CN2023/076331; Int'l Search Report; dated May 9, 2023; 4 pages.

Japan Patent Application No. 2024-548579; Notice of Refusal; dated Feb. 25, 2025; 12 pages.

European Patent Application No. 23755824.2; Extended Search Report; dated Apr. 1, 2025; 9 pages.

Korea Patent Application No. 10-2024-7029487; Office Action; dated Nov. 19, 2025; 19 pages.

Indian Patent Application No. 202427062934; Examination Report dated Dec. 18, 2025, 8 pages.

\* cited by examiner

SESSION METHOD AND APPARATUS, ELECTRONIC DEVICE, AND STORAGE MEDIUM

CROSS-REFERENCE TO RELATED APPLICATIONS

The present disclosure is a continuation of PCT/CN2023/076331, filed on Feb. 16, 2023, which is based on and claims the benefit of Chinese Patent Application for invention No. 202210153210.9, filed on Feb. 18, 2022 and entitled "SESSION METHOD AND APPARATUS, ELECTRONIC DEVICE, AND STORAGE MEDIUM", the disclosure of which is hereby incorporated into this disclosure by reference in its entirety.

TECHNICAL FIELD

The present disclosure relates to the field of information technology, and in particular, to a session method and apparatus, an electronic device, and a storage medium.

BACKGROUND

With the continuous development of network technology and terminal technology, more and more clients appear, and users can conduct different online activities through different types of clients. For example, users may conduct social activities such as chats through a social client.

SUMMARY

An embodiment of the present disclosure provides a session method, applied to a client of a first user, comprising:
  receiving, on a session interface, a preset message sent from a second user, the preset message being configured to trigger displaying an entrance for setting a preset function;
  in response to the entrance for setting the preset function being triggered, displaying a region for setting the preset function; and
  in response to a setting operation for the preset function in the region for setting the preset function, setting the preset function of the client of the first user.

An embodiment of the present disclosure further provides a session apparatus, integrated in a client of a first user, comprising:
  a first receiving module, configured to receive, on a session interface, a preset message sent from a second user, the preset message being configured to trigger displaying an entrance for setting a preset function;
  a first display module, configured to, in response to the entrance for setting the preset function being triggered, display a region for setting the preset function; and
  a first setting module, configured to, in response to a setting operation for the preset function in the region for setting the preset function, set the preset function of the client of the first user.

An embodiment of the present disclosure further provides an electronic device, comprising:
  one or more processors;
  storage device configured to store one or more programs, which, when executed by the one or more processors, cause the one or more processors to implement the session method as described above.

An embodiment of the present disclosure further provides a non-transitory computer-readable storage medium having thereon stored a computer program, which when executed by a processor, implements the session method as described above.

An embodiment of the present disclosure further provides a computer program product comprising a computer program or instructions which, when executed by a processor, implement the session method as described above.

BRIEF DESCRIPTION OF THE DRAWINGS

The above and other features, advantages, and aspects of embodiments of the present disclosure will become more apparent by referring to the following DETAILED DESCRIPTION when taken in conjunction with the accompanying drawings. Throughout the drawings, the same or similar reference numbers refer to the same or similar elements. It should be understood that the drawings are schematic and that elements and components are not necessarily drawn to scale.

DETAILED DESCRIPTION

Figure 1:
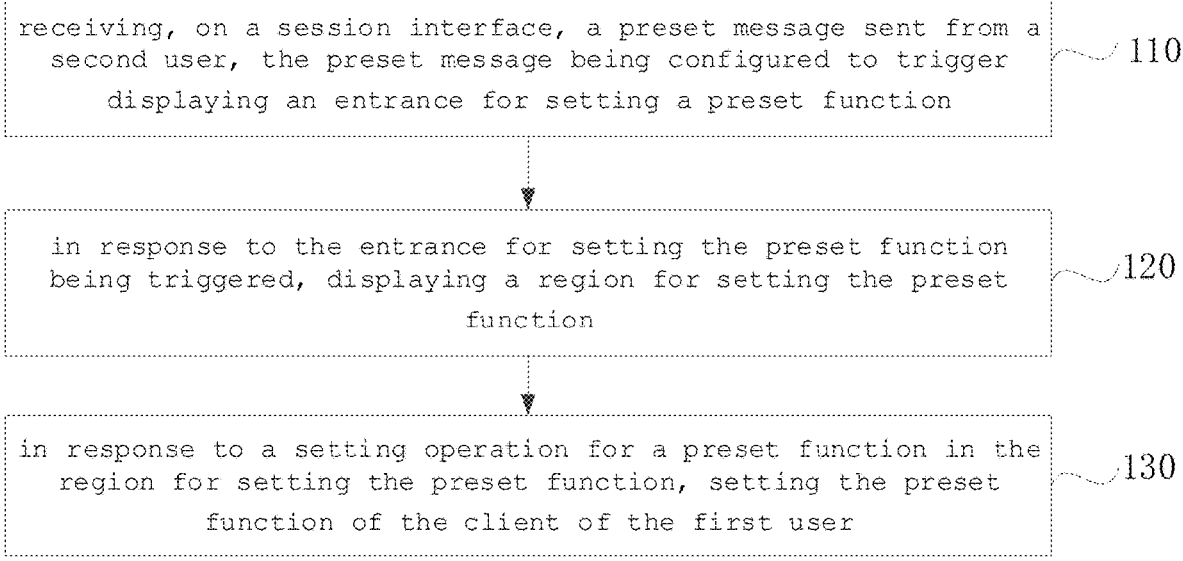
FIG. 1 is a flowchart of a session method in an embodiment of the present disclosure.

The embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein, but rather these embodiments are provided for a more complete and thorough understanding of the present disclosure. It should be understood that the drawings and the embodiments of the present disclosure are for illustration purposes only and are not intended to limit the scope of the present disclosure.

It should be understood that the various steps recited in method embodiments of the present disclosure may be performed in a different order, and/or performed in parallel. Moreover, the method embodiments may comprise additional steps and/or omit performing the illustrated steps. The scope of the present disclosure is not limited in this respect.

The term "comprising" and variations thereof as used herein are intended to be open-ended, i.e., "comprising but not limited to". The term "based on" is "based at least in part on". The term "one embodiment" means "at least one embodiment"; the term "another embodiment" means "at least one additional embodiment"; the term "some embodiments" means "at least some embodiments". Relevant definitions for other terms will be given in the following description.

It should be noted that the terms "first", "second", and the like in the present disclosure are only used for distinguishing different devices, modules or units, and are not used for limiting the order or interdependence of the functions performed by the devices, modules or units.

It is noted that references to "a" or "an" in this disclosure are intended to be illustrative rather than limiting, and that those skilled in the art will appreciate that they should be understood as "one or more" unless the context clearly indicates otherwise.

The names of messages or information exchanged between devices in the embodiments of the present disclosure are for illustrative purposes only, and are not intended to limit the scope of the messages or information.

In the process that users conduct different online activities through different types of clients, in order to bring better usage experience to the users, service functions of the clients shall be continuously upgraded.

In order to solve the above technical problem or at least partially solve the above technical problem, the embodiments of the present disclosure provide a session method and apparatus, an electronic device, and a non-transitory storage medium, achieving the purpose of performing function setting on a client of a first user based on session behaviors of a second user in a session process, enhancing interactivity in the session process, and contributing to improving user experience.

FIG. 1 is a flowchart of a session method in an embodiment of the present disclosure. The session method may be performed by a session apparatus, which may be implemented in software and/or hardware. The session apparatus may be configured in an electronic device. For example, the electronic device is a terminal, which specifically comprises, but is not limited to, a smart phone, a palm computer, a tablet computer, a wearable device with a display screen, a desktop computer, a notebook computer, an all-in-one machine, a smart home device, and the like.

It is understood that at least two users are involved in the session process, and in order to distinguish between the two users, the two users are referred to as a first user and a second user, respectively. For example, in a session between ZHANG San and LI Si, ZHANG San may be referred to as a first user and LI Si as a second user. Correspondingly, a session application used by ZHANG San is called a client of the first user, and a session application used by LI Si is called a client of the second user.

As shown in FIG. 1, the method specifically comprises the following steps 110 to 130.

In the step 110, a preset message sent from a second user is received on a session interface, the preset message being configured to trigger displaying an entrance for setting a preset function.

That is, through the session interface of the first user and the second user, the first user, by receiving the preset message sent from the second user, can obtain relevant settings for preset functions of the client, which are recommended, prompted or reminded to the first user by the second user. The preset message may be a message that is triggered by the second user through a preset control and sent to the first user, and satisfies a predetermined data format.

In some embodiments, the preset message comprises an identifier of the entrance for setting the preset function, and/or the first user triggers the identifier of the entrance for setting the preset function to be displayed by performing a preset gesture operation on the preset message (for example, sliding the preset message along a set direction, and the like). Through the identifier of the entrance for setting the preset function, a region for setting the preset function can be entered, in which setting of the preset function is completed.

In summary, the preset message comprises an entrance identifier for preset function setting; and/or performing a preset gesture operation on the preset message to trigger displaying the identifier of the entrance for setting the preset function.

By configuring the preset message to be capable of triggering the entrance for setting the preset function, a fast entrance for setting the preset function can be provided for the first user, thereby simplifying an operation path for the first user to set the preset function of the client of the first user, contributing to improving the user experience, and an interactive feeling in the session process can be improved by receiving the preset message on the session interface for sharing the setting of the preset function.

In step 120, in response to the entrance for setting the preset function being triggered, a region for setting the preset function is displayed.

In step 130, in response to a setting operation for a preset function in the region for setting the preset function, the preset function of the client of the first user is set.

In some embodiments, the setting the preset function of the client of the first user comprises:
  setting a session function attribute of the client of the first user; and/or
  setting an application function attribute and/or a system function attribute of the client of the first user.

The session function attribute may specifically refer to a function attribute corresponding to the session interface, for example, a background of the session interface, a presentation form of a session message, a function control associated with a session, and the like. Namely, an interface for setting the background of the session interface can be accessed through the preset message; or an interface for setting the presentation form of the session message can be accessed through the preset message; or an interface for setting the function control associated with the session can be accessed through the preset message. In some embodiments, the presentation form of the session message may be a shape, size of a session bubble, or a presentation form of a session font, and the like. In some embodiments, the setting of the function control associated with the session may be: to add the function control associated with the session, to delete the function control associated with the session, to adjust a position of the function control associated with the session, or the like.

The application function attribute comprises an application configurable function attribute and/or an application setup attribute. The application configurable function attribute refers to a configurable function attribute of an application to which the session interface belongs. For example, the application to which the session interface belongs is an application A through which, users follow each other to become friends capable of privately communicating, and the application A configurable function attribute may be an alarm clock set by the application A to remind the user of having an early night. The application setup attribute may refer to a font, a font size used by the application, a volume for alarm, a type of alarm sound or a color employed, and the like.

The system function attribute comprises a system configurable function attribute and/or a system setup attribute. The system may refer to a system of a terminal device in which the client of the first user is installed. The system configurable function attribute is for example to set reminders, schedules for meeting etc. The system setup attribute is, for example, to set ring, vibration, mute, etc., to set the network as a mobile network, a wireless network, etc.

Figure 2:
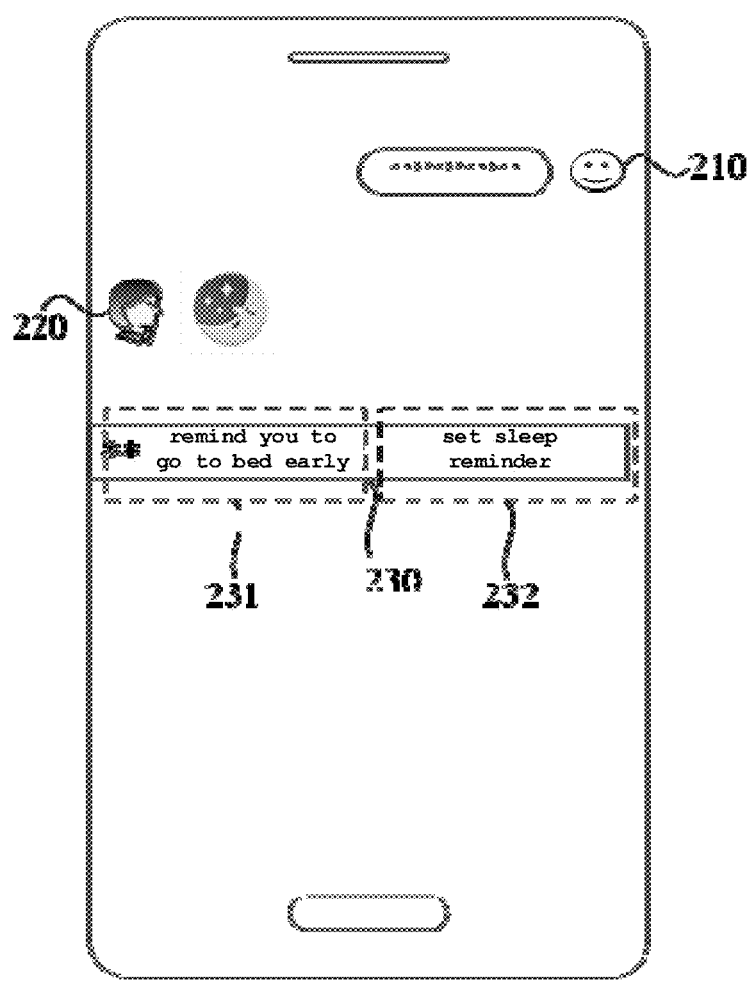
FIG. 2 is a schematic diagram of a session interface of a first user in an embodiment of the present disclosure.
Figure 3:
FIG. 3 is a schematic diagram of an interface in an embodiment of the present disclosure.

Taking an example that a second user reminds a first user to go to bed early, reference is made to a schematic diagram of a session interface of a first user as shown in FIG. 2, where a first avatar 210 represents the first user, a second avatar 220 represents the second user, and the session interface comprises a preset message 230 sent from the second user 220 to the first user 210, wherein the preset message 230 comprises a message for prompt "remind you to go to bed early" 231 and an entrance identifier 232 for setting a sleep reminder. The first user may enter an interface for setting sleep reminder time as shown in FIG. 3 by clicking the entrance identifier 232, and specific reminder time can be set based on the interface for setting as shown in FIG. 3**.

Figure 4:
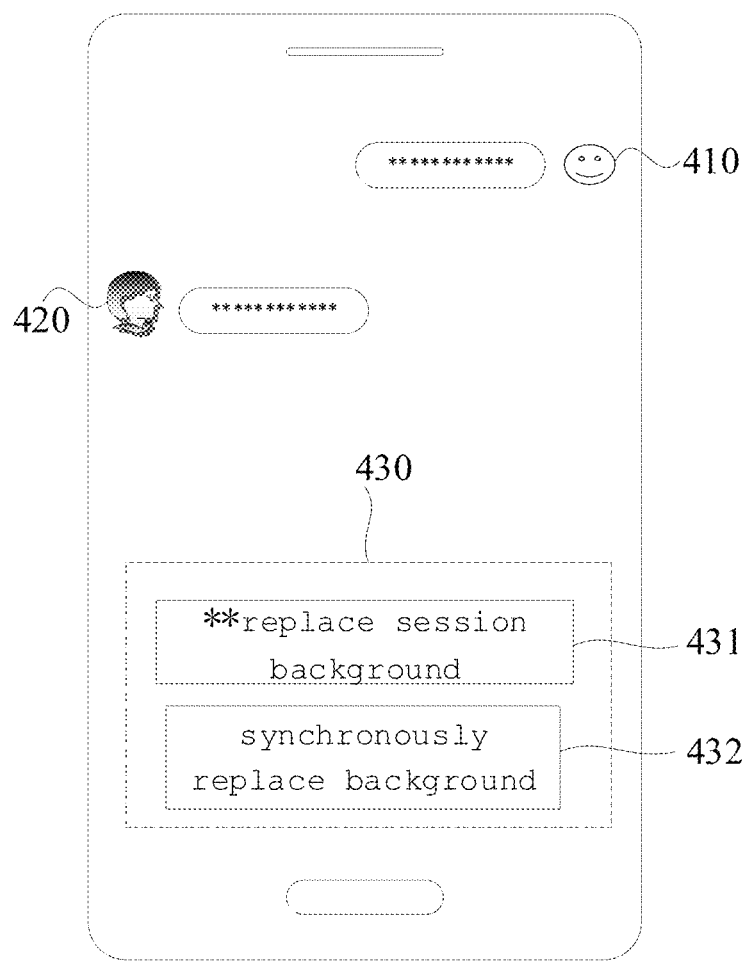
FIG. 4 is a schematic diagram of a session interface of a first user in an embodiment of the present disclosure.

Taking an example that a second user invites a first user to replace a background of the session interface together, reference is made to a schematic diagram of a session interface of a first user as shown in FIG. 4, where a first avatar 410 represents the first user, a second avatar 420 represents the second user, and the session interface comprises a preset message 430 sent from the second user 420 to the first user 410, wherein the preset message 430 comprises a message for prompt "replace session background" 431 and an entrance identifier 432 for synchronously replacing the background. The first user can enter a setting interface for the session background by clicking the entrance identifier 432**, and the session background can be set based on the setting interface.

In the above embodiment, the first user enters the setting interface for the preset function to perform setting by himself based on the preset message, and the second user only prompts the first user to perform setting of the preset function on the client of the first user, but does not send the setting of the preset function to the client of the first user.

In some embodiments, the second user may send the setting of the preset function directly to the client of the first user through the preset message. For example, the preset message comprises a configuration information identifier, which corresponds to configuration information sent from the second user for the preset function of the client of the first user; in response to an operation triggered based on the configuration information identifier, the preset function of the client of the first user is set according to the configuration information. That is, the first user only needs to trigger an operation showing that the first user accepts the configuration information sent from the second user for the preset function of the client of the first user, to set the preset function of the client of the first user, without the need of entering the setting interface again to select setting parameters, further simplifying the operation path, and enriching the interactive feeling in the session process.

In some embodiments, the configuration information identifier corresponds to configuration information of the second user for a preset function of a client of the second user; in response to an operation triggered based on the configuration information identifier, the preset function of the client of the first user is set according to the configuration information, so that the first user and the second user share a same setting of the preset function.

That is, in response to the second user sending the configuration information for the preset function of the client of the first user, the configuration information of the preset function of the client of the second user may be shared with the first user, or adaptive configuration information may be set for the first user in a personalized manner. In other words, the configuration information of the preset function of the client of the first user is the same as or different from the configuration information of the preset function of the client of the second user. Taking FIG. 5 as an example, the second user sends configuration information of an early-to-bed reminder to the first user, in which reminder time is comprised, and at this time, the first user may click "accept" to directly accept the early-to-bed reminder function configuration sent from the second user and the reminder time. The early-to-bed reminder function configuration may be the configuration of the second user himself, or may be the configuration in response to the client of the second user not configuring the function, or the client of the second user configures the early-to-bed reminder function, but the reminder time is different from that of the client of the first user. In some embodiments, in response to the first user accepts the configuration information sent from the second user, or the configuration information sent from the second user is the same as the current configuration information for the function of the first user, a feedback message may be sent to the second user.

In some embodiments, the second user may also send multiple pieces of configuration information to the first user at the same time, and the first user may select to accept all or part of functions required by the first user according to actual needs.

In addition, in response to the second user sending the preset function and the configuration information thereof at the same time to the first user, a selection interface can be also provided for the first user, so that the first user can select to accept only the preset function sent from the second user, and adjust specific configuration information corresponding to the preset function. For example, the second user sends to the first user, configuration information of early-to-bed reminder of 22:00, in which reminder time is comprised, and the first user can accept only the early-to-bed reminder function, but adjust the early-to-bed reminder time to 22:30. In some embodiments, the adjustment information of the first user may be fed back to the second user at this time.

In some embodiments, in order to enable the first user to autonomously decide whether to accept the configuration information sent from the second user, to enhance configuration flexibility, the in response to an operation triggered based on the configuration information identifier, setting the preset function of the client of the first user according to the configuration information, comprises:

in response to an operation of triggering the configuration information identifier, displaying a first control; and in response to an operation of triggering the first control, setting the preset function of the client of the first user according to the configuration information, so that the client of the first user currently sets the preset function corresponding to the configuration information. In response to the first user triggering the first control, the preset function of the client of the first user is set according to the configuration information, and the background of the session interface of the client of the first user is set only according to the current configuration information, and in response to the second user resetting the background of the session interface of the client of the second user, the background of the session interface of the client of the first user is not configured automatically and synchronously; and in response to the first user not triggering the first control, the preset function of the client of the first user is not set.

Figure 5:
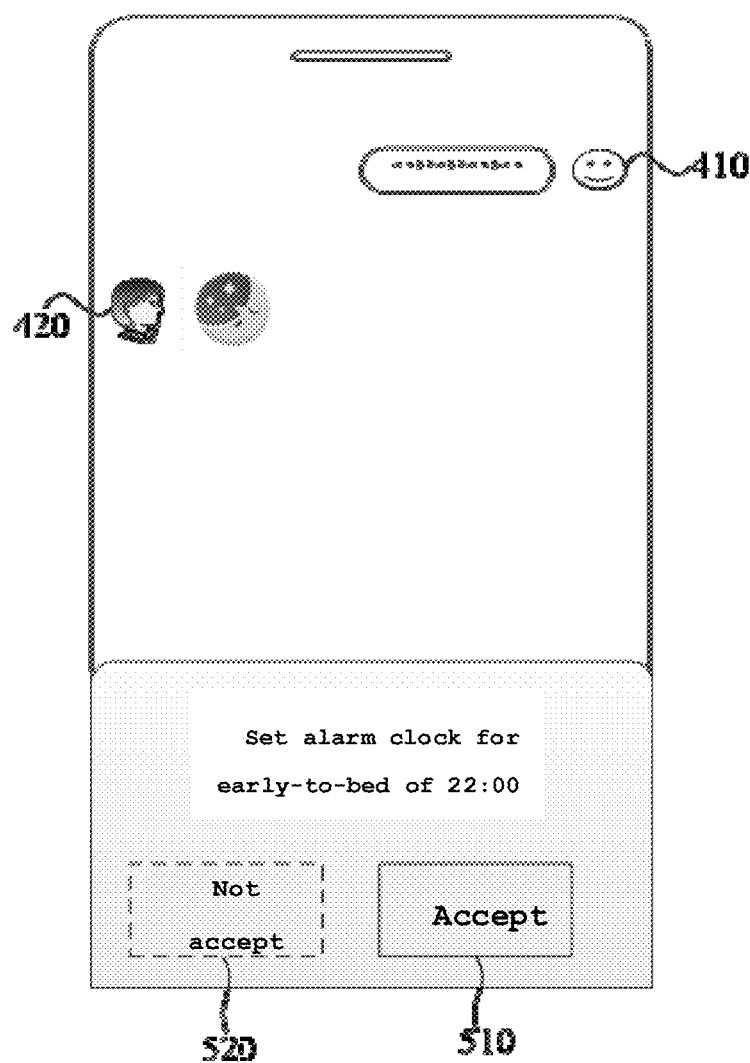
FIG. 5 is a schematic diagram of an interface in an embodiment of the present disclosure.

In some embodiments, to improve user interaction experience, reference is made continuously to the interface shown in FIG. 5, where the interface comprises a third control 510 and a fourth control 520; in response to the first user triggering the third control 510, the preset function of the client of the first user is set according to the configuration information, and the background of the session interface of the client of the first user is set only according to the current configuration information, and in response the second user resetting the background of the session interface of the client of the second user, the background of the session interface of the client of the first user is not configured automatically synchronously. In response to the first user triggering the fourth control 520, the preset function of the client of the first user is not set, that is, the first user can refuse to accept the configuration information sent from the second user by triggering the fourth control 520.

Figure 6:
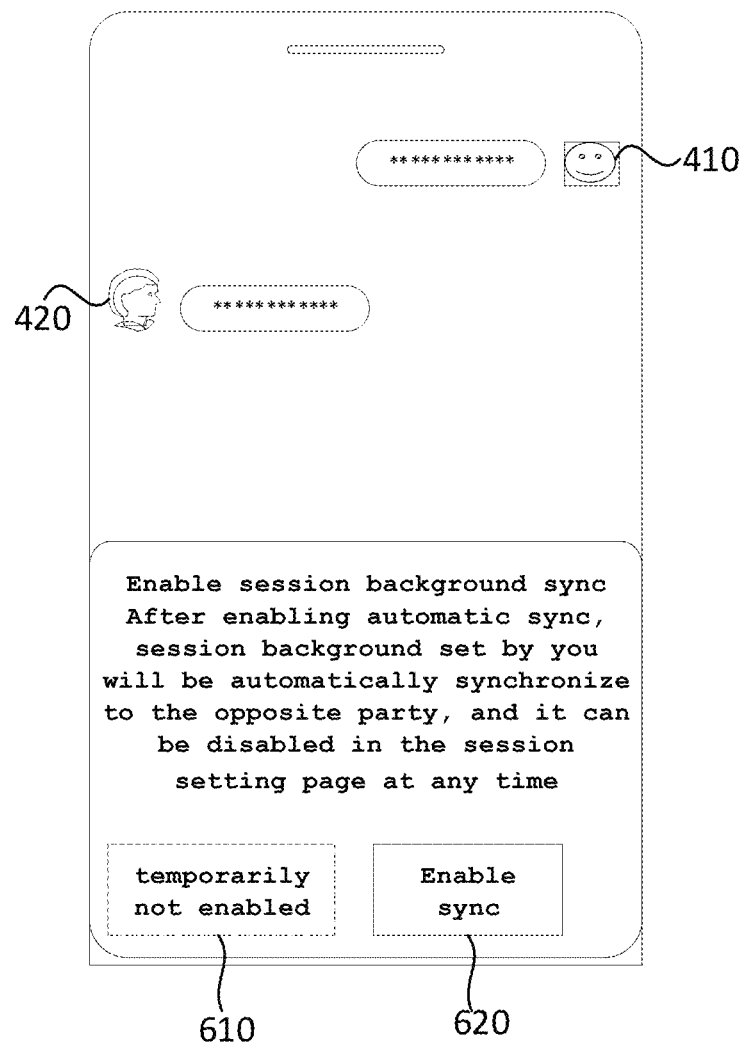
FIG. 6 is a schematic diagram of an interface in an embodiment of the present disclosure.

In some embodiments, to enrich interactivity in the session process, simplify configuration operations of the first user, and shorten a distance between the first user and the second user, a default automatic configuration control may be further added, such that in response to the first user triggers the default automatic configuration control, whenever the second user configures the preset function of the client of the second user, the same preset function of the client of the first user is synchronously configured with same parameters. Reference is made to a schematic diagram of an interface shown in FIG. 6, where the interface is accessible by the first user triggering for example the entrance identifier 432 in FIG. 4, and the interface comprises a fifth control 610 and a second control 620. In response to the first user triggers the second control 620, the background of the session interface of the client of the first user is set according to the current configuration information, and whenever the second user resets the background of the session interface of the client of the second user, the session interface background of the client of the first user is configured automatically synchronously. In response to the first user triggering the fifth control 610, the automatic synchronization function is not enabled, and the background of the session interface of the client of the first user may be set only according to the current configuration information, and in response to the second user resetting the background of the session interface of the client of the second user, the background of the session interface of the client of the first user is not configured automatically synchronously.

In some embodiments, the second control 620 may also be triggered through other entrances, such as a setup control. In general, the session method further comprises: in response to a preset condition being met, displaying a second control on the session interface; and in response to an operation of triggering the second control, configuring the client of the first user to set the preset function from the current time moment with the configuration information sent from the client of the second user by default.

Figure 7:
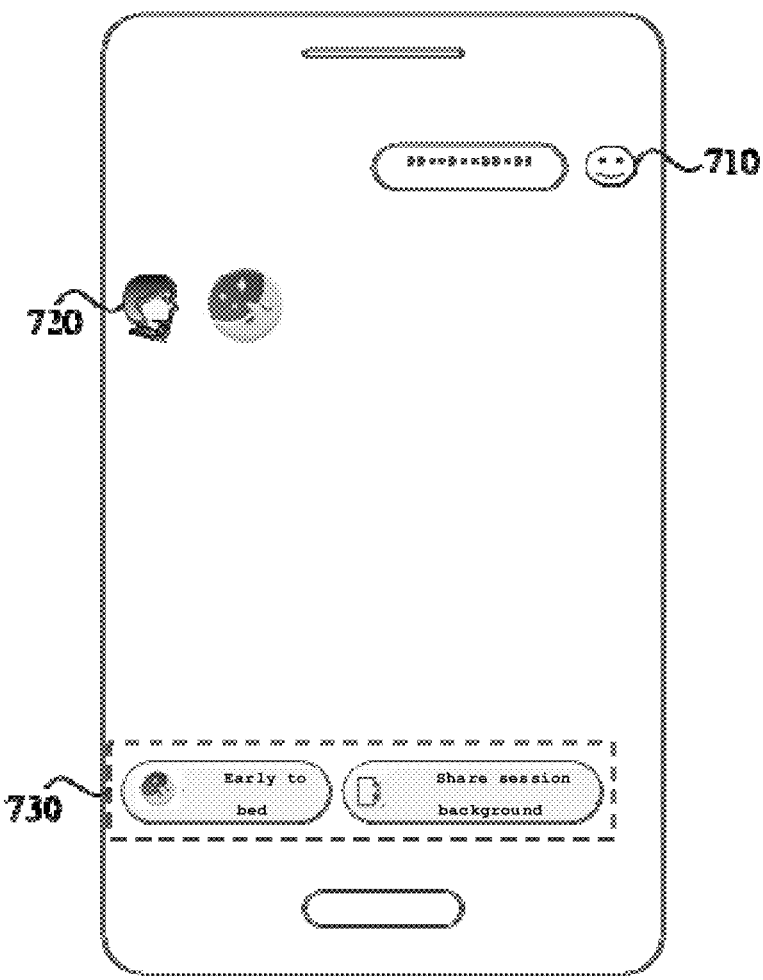
FIG. 7 is a schematic diagram of a session interface of a first user in an embodiment of the present disclosure.

In some embodiments, reference is made to a schematic diagram of a session interface of a first user shown in FIG. 7, where a first avatar 710 represents the first user, a second avatar 720 represents the second user, and a preset control 730 is displayed on the session interface, for sending a preset message in response to being triggered. That is, the first user may send a preset message to the second user by triggering the preset control 730, to recommend, prompt or remind the second user of relevant settings of the preset function for the client. For example, in response to the preset control 730 being triggered, the first user may select to synchronize his own configuration information, or directly set corresponding configuration information for the second user.

In some embodiments, it may be further configured that, the preset control 730 is displayed on the session interface in response to a certain condition being met. For example, in response to the time reaching a time point (e.g., 10 pm) for sleep and rest, the preset control 730 is displayed on the session interface. By means of the setting, the utilization rate of the preset control 730 can be increased, meanwhile, the user is not disturbed in unnecessary time, improving the usage experience of the user.

The session method provided by the embodiments of the present disclosure can share function settings to an opposite party in the session process. For example, the function settings can be made on the client of the first user based on the preset message sent from the second user to the first user on the session interface, enhancing interactivity in the session process, and contributing to improving the user experience.

Figure 8:
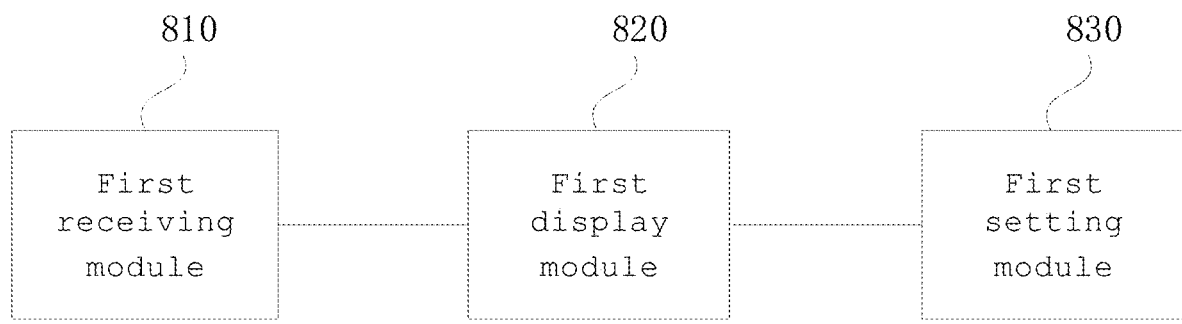
FIG. 8 is a schematic diagram of a session apparatus in an embodiment of the present disclosure.

FIG. 8 is a schematic structural diagram of a session apparatus in an embodiment of the present disclosure. The session apparatus provided by the embodiment of the present disclosure may be configured in a client of a first user. The session apparatus specifically comprises:

a first receiving module 810, configured to receive, on a session interface, a preset message sent from a second user, the preset message being configured to trigger displaying an entrance for setting a preset function;

a first display module 820, configured to, in response to the entrance for setting the preset function being triggered, display a region for setting the preset function; and a first setting module 830, configured to, in response to a setting operation for a preset function in the region for setting the preset function, set the preset function of the client of the first user.

In some embodiments, the preset message being configured to trigger displaying an entrance for setting a preset function, comprises: the preset message comprising an identifier of the entrance for setting the preset function; and/or the preset message on which performing a preset gesture operation triggers displaying the identifier of the entrance for setting the preset function.

In some embodiments, the first setting module 830 is specifically configured to set a session function attribute of the client of the first user; and/or set an application function attribute and/or a system function attribute of the client of the first user.

In some embodiments, the session function attribute comprise one or more of:

a background of the session interface, a presentation form of a session message, or a function control associated with a session.

In some embodiments, the application function attribute comprises an application configurable function attribute and/or an application setup attribute; the system function attribute comprises a system configurable function attribute and/or a system setup attribute.

In some embodiments, the preset message comprises a configuration information identifier that corresponds to configuration information sent from the second user for the preset function of the client of the first user; the session apparatus further comprises a second setting module, configured to, in response to an operation triggered based on the configuration information identifier, set the preset function of the client of the first user according to the configuration information.

In some embodiments, the preset message comprises a configuration information identifier that corresponds to configuration information of the second user for a preset function of a client of the second user; the second setting module is further configured to, in response to an operation triggered based on the configuration information identifier, set the preset function of the client of the first user according to the configuration information, so that the first user and the second user share a same setting of the preset function.

In some embodiments, the second setting module comprises a display unit, configured to display a first control in response to an operation of triggering the configuration information identifier; and a setting unit is configured to, in response to an operation of triggering the first control, set the preset function of the client of the first user according to the configuration information, so that the client of the first user currently sets the preset function corresponding to the configuration information.

In some embodiments, the session apparatus further comprises: a second display module configured to, in response to a preset condition being met, display a second control on the session interface; and a configuring module configured to, in response to an operation of triggering the second control, configure the client of the first user to set the preset function from a current time with the configuration information sent from the client of the second user by default.

In some embodiments, the session apparatus further comprises: a third display module configured to, display a preset control on the session interface, the preset control being configured to send the preset message in response to being triggered.

The session apparatus provided by the embodiments of the present disclosure may perform the steps in the session method provided by the method embodiments of the present disclosure, and the steps and the beneficial effects are not repeated herein again.

Figure 9:
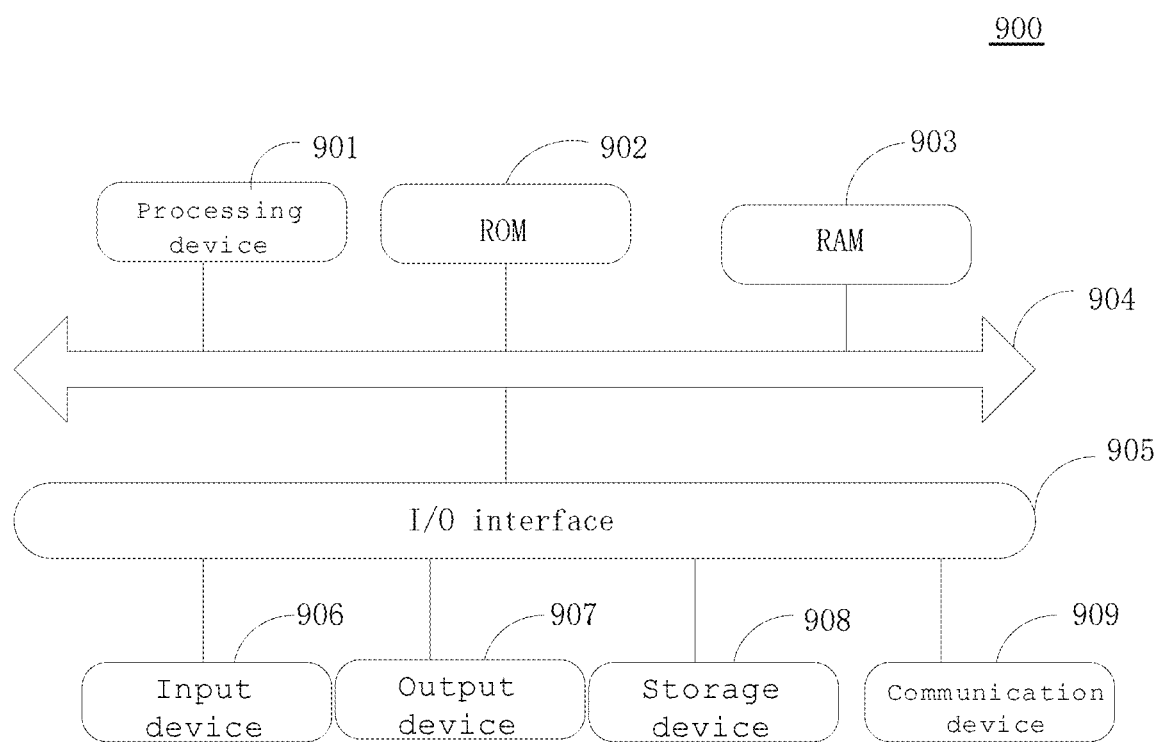
FIG. 9 is a schematic structural diagram of an electronic device in an embodiment of the present disclosure.

FIG. 9 is a schematic structural diagram of an electronic device in an embodiment of the present disclosure. Reference is now specifically made to FIG. 9, which a schematic structural diagram of an electronic device 900 suitable for use in implementing the embodiments of the present disclosure. The electronic device 900 in the embodiments of the present disclosure may comprise, but is not limited to, a mobile terminal such as a mobile phone, a notebook computer, a digital broadcast receiver, a PDA (personal digital assistant), a PAD (tablet computer), a PMP (portable multimedia player), an in-vehicle terminal (e.g., a car navigation terminal), a wearable electronic device, and the like, and a fixed terminal such as a digital TV, a desktop computer, a smart home device, and the like. The electronic device shown in FIG. 9 is only an example, and should not bring any limitation to the functions and the use range of the embodiments of the present disclosure.

As shown in FIG. 9, the electronic device 900 may comprise a processing device (e.g., central processing unit, graphics processor, etc.) 901 that may perform various suitable actions and processes to implement the methods of the embodiments as described in this disclosure in accordance with programs stored in a Read Only Memory (ROM) 902 or programs loaded from a storage device 908 into a Random Access Memory (RAM) 903. In the RAM 903, various programs and data necessary for the operation of the electronic device 900 are also stored. The processing device 901, ROM 902, and RAM 903 are connected to each other via a bus 904. An input/output (I/O) interface 905 is also connected to the bus 904.

Generally, the following means may be connected to the I/O interface 905: input device 906 comprising, for example, a touch screen, touch pad, keyboard, mouse, camera, microphone, accelerometer, gyroscope, etc.; an output device 907 comprising, for example, a Liquid Crystal Display (LCD), a speaker, a vibrator, and the like; the storage device 908 comprising, for example, magnetic tape, hard disk, etc.; and a communication device 909. The communication device 909 may allow the electronic device 900 to communicate with other devices wirelessly or by wire to exchange data. While FIG. 9 illustrates the electronic device 900 having various means, it is to be understood that not all illustrated means are required to be implemented or provided. More or fewer means may be alternatively implemented or provided.

In particular, the processes described above with reference to the flowcharts may be implemented as computer software programs, according to the embodiments of the present disclosure. For example, the embodiments of the present disclosure comprise a computer program product comprising a computer program carried on a non-transitory computer readable medium, the computer program containing program code for performing the method illustrated by the flowchart, thereby implementing the session method as described above. In such an embodiment, the computer program may be downloaded and installed from a network through the communication device 909, or installed from the storage device 908, or installed from the ROM 902. The computer program, when executed by the processing device 901, performs the above-described functions defined in the methods of the embodiments of the present disclosure.

It should be noted that, the computer readable medium of the present disclosure may be a computer readable signal medium or a non-transitory computer readable storage medium or any combination of the two. The non-transitory computer readable storage medium may be, for example, but not limited to, an electronic, magnetic, optical, electromagnetic, infrared, or semiconductor system, apparatus, or device, or any combination of the foregoing. More specific examples of the non-transitory computer readable storage medium may comprise, but are not limited to: an electrical connection having one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the non-transitory computer readable storage medium may be any tangible medium that can contain, or store a program for use by or in connection with an instruction execution system, apparatus, or device. In contrast, in the present disclosure, the computer readable signal medium may comprise a propagated data signal with computer readable program code embodied therein, for example, in baseband or as part of a carrier wave. Such a propagated data signal may take any of a variety of forms, comprising, but not limited to, electro-magnetic, optical, or any suitable combination thereof. The computer readable signal medium may be any other computer readable medium than the non-transitory computer readable storage medium, and can communicate, propagate, or transport a program for use by or in connection with an instruction execution system, apparatus, or device. Program code embodied on the computer readable medium may be transmitted using any appropriate medium, comprising but not limited to: electrical wires, optical cables, RF (radio frequency), etc., or any suitable combination of the foregoing.

In some embodiments, the clients, servers may communicate using any currently known or future developed network protocol, such as HTTP (HyperText Transfer Protocol), and may be interconnected with any form or medium of digital data communication (e.g., a communication network). Examples of communication networks comprise a local area network ("LAN"), a wide area network ("WAN"), internet (e.g., the Internet), and peer-to-peer networks (e.g., ad hoc peer-to-peer networks), as well as any currently known or future developed network.

The computer readable medium may be embodied in the electronic device; or may be separate and not assembled into the electronic device.

The computer readable medium carries one or more programs which, when executed by the electronic device, cause the electronic device to: receive, on a session interface, a preset message sent from a second user, the preset message being configured to trigger displaying an entrance for setting a preset function; in response to the entrance for setting the preset function being triggered, display a region for setting the preset function; and in response to a setting operation for a preset function in the region for setting the preset function, set the preset function of the client of the first user.

In some embodiments, when the one or more programs are executed by the electronic device, the electronic device may also perform other steps described in the embodiments above.

Computer program code for carrying out the operations of the present disclosure may be written in one or more programming languages or any combination thereof, comprising but not limited to an object oriented programming language such as Java, Smalltalk, C++, a conventional procedural programming language such as "C" language or similar programming languages. The program code may execute entirely on a user's computer, partly on a user's computer, as a stand-alone software package, partly on a user's computer and partly on a remote computer or entirely on a remote computer or a server. In the situation where a remote computer is involved, the remote computer may be connected to the user's computer through any type of network, comprising a Local Area Network (LAN) or a Wide Area Network (WAN), or may be connected to an external computer (for example, through the Internet using an Internet service provider).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in a reverse order, depending upon the functionality involved. It will also be noted that each block of the block diagrams and/or flowcharts, and combinations of the blocks of the block diagrams and/or flowcharts, can be implemented by special purpose hardware-based systems that perform the specified functions or operations, or combinations of special purpose hardware and computer instructions.

The units described in the embodiments of the present disclosure may be implemented by software or hardware. The name of the unit does not in some cases constitute a limitation on the unit itself.

The functions described herein above may be performed, at least in part, by one or more hardware logic components. For example, without limitation, exemplary types of the hardware logic components that may be used comprise: field Programmable Gate Array (FPGA), Application Specific Integrated Circuit (ASIC), Application Specific Standard Product (ASSP), system on a chip (SOC), Complex Programmable Logic Device (CPLD), and the like.

In the context of this disclosure, the machine-readable medium may be a tangible medium that can contain, or store a program for use by or in connection with an instruction execution system, apparatus, or device. The machine-readable medium may be a machine-readable signal medium or a non-transitory machine-readable storage medium. The machine-readable medium may comprise, but is not limited to, an electronic, magnetic, optical, electromagnetic, infrared, or semiconductor system, apparatus, or device, or any suitable combination of the foregoing. More specific examples of the non-transitory machine-readable storage medium would comprise an electrical connection based on one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

In accordance with one or more embodiments of the present disclosure, there is provided a session method, comprising: receiving, on a session interface, a preset message sent from a second user, the preset message being configured to be capable of triggering an entrance for setting a preset function; in response to the entrance for setting the preset function being triggered, displaying a region for setting the preset function; and in response to a setting operation for a preset function in the region for setting the preset function, setting the preset function of the client of the first user.

In accordance with one or more embodiments of the present disclosure, in the session method provided by the present disclosure, in some embodiments, the preset message being configured to be capable of triggering an entrance for setting a preset function, comprises: the preset message comprising an identifier of the entrance for setting the preset function; and/or the preset message on which performing a preset gesture operation triggers displaying the identifier of the entrance for setting the preset function.

In accordance with one or more embodiments of the present disclosure, in the session method provided by the present disclosure, in some embodiments, the setting the preset function of the client of the first user comprises: setting a session function attribute of the client of the first user; and/or setting an application function attribute and/or a system function attribute of the client of the first user.

In accordance with one or more embodiments of the present disclosure, in the session method provided by the present disclosure, in some embodiments, the session function attribute comprises one or more of: a background of the session interface, a presentation form of a session message, or a function control associated with a session.

In accordance with one or more embodiments of the present disclosure, in the session method provided by the present disclosure, in some embodiments, the application function attribute comprises an application configurable function attribute and/or an application setup attribute; and the system function attribute comprises a system configurable function attribute and/or a system setup attribute.

According to one or more embodiments of the present disclosure, in the session method provided by the present disclosure, in some embodiments, the preset message comprises a configuration information identifier which corresponds to configuration information sent from the second user for the preset function of the client of the first user; and in response to an operation triggered based on the configuration information identifier, the preset function of the client of the first user is set according to the configuration information.

According to one or more embodiments of the present disclosure, in the session method provided by the present disclosure, in some embodiments, the preset message comprises a configuration information identifier which corresponds to configuration information of the second user for a preset function of a client of the second user; and in response to an operation triggered based on the configuration information identifier, the preset function of the client of the first user is set according to the configuration information, so that the first user and the second user share a same setting of the preset function.

In accordance with one or more embodiments of the present disclosure, in the session method provided by the present disclosure, in some embodiments, the in response to an operation triggered based on the configuration information identifier, the preset function of the client of the first user is set according to the configuration information, comprises: in response to an operation of triggering the configuration information identifier, a first control is displayed; and in response to an operation of triggering the first control, the preset function of the client of the first user is set according to the configuration information, so that the client of the first user currently sets the preset function corresponding to the configuration information.

In accordance with one or more embodiments of the present disclosure, in the session method provided by the present disclosure, in some embodiments, the method further comprises: in response to a preset condition being met, displaying a second control on the session interface; and in response to an operation for triggering the second control, configuring the client of the first user to set the preset function from a current time moment with the configuration information sent from the client of the second user by default.

In accordance with one or more embodiments of the present disclosure, in the session method provided by the present disclosure, in some embodiments, the method further comprises: displaying a preset control on the session interface, the preset control being configured to send the preset message in response to being triggered.

According to one or more embodiments of the present disclosure, there is provided an session apparatus, comprising: a first receiving module, configured to receive, on a session interface, a preset message sent from a second user, the preset message being configured to be capable of triggering an entrance for setting a preset function; a first display module, configured to, in response to the entrance for setting the preset function being triggered, display a region for setting the preset function; and a first setting module, configured to, in response to a setting operation for a preset function in the region for setting the preset function, set the preset function of the client of the first user.

In accordance with one or more embodiments of the present disclosure, there is provided an electronic device comprising:
 one or more processors;
 a memory configured to store one or more programs, which
 when executed by the one or more processors, cause the one or more processors to implement any of the session methods provided by the present disclosure.

According to one or more embodiments of the present disclosure, there is provided a non-transitory computer-readable storage medium having stored thereon a computer program which, when executed by a processor, implements any of the session methods provided by the present disclosure.

In accordance with one or more embodiments of the present disclosure, there is provided a computer program comprising: instructions that when executed by a processor, cause the processor to perform any of the session methods provided by the present disclosure.

Compared with the related art, the technical solutions provided by the embodiments of the present disclosure have at least the following advantages: according to the session method provided by the embodiments of the present disclosure, by receiving, on a session interface, a preset message sent from a second user, the preset message being configured to be capable of triggering an entrance for setting a preset function; in response to the entrance for setting the preset function being triggered, displaying a region for setting the preset function; and in response to a setting operation for a preset function in the region for setting the preset function, setting the preset function of the client of the first user, function settings can be shared to opposite parties in the session process. For example, the function setting can be made on the client of the first user based on the preset message sent from the second user to the first user on the session interface, enhancing interactivity in the session process, and contributing to improving the user experience.

The foregoing only illustrates the preferred embodiments of the present disclosure and the technical principles employed. It should be appreciated by those skilled in the art that the disclosure scope involved in the present disclosure is not limited to the technical solutions formed by specific combinations of the technical features described above, but also encompasses other technical solutions formed by arbitrary combinations of the above technical features or equivalent features thereof without departing from the above disclosed concepts, for example, a technical solution formed by performing mutual replacement between the above features and technical features having similar functions to those disclosed (but not limited to) in the present disclosure.

Furthermore, while operations are depicted in a specific order, this should not be understood as requiring that these operations be performed in the specific order shown or in a sequential order. Under certain circumstances, multitasking and parallel processing may be advantageous. Similarly, while several specific implementation details are comprised in the above discussion, these should not be construed as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or method logical actions, it should be understood that the subject matter defined in the attached claims is not necessarily limited to the specific features or actions described above. Rather, the specific features and actions described above are only example forms of implementing the claims.

What is claimed is:

1. A session method, applied to a client associated with a first user, comprising:
   receiving a preset message sent from a second user to the first user, wherein the preset message is sent to the first user by the second user triggering a preset control;
   displaying the preset message in an area of displaying messages on a session interface, wherein the preset message is configured to prompt the first user to set a preset function, the preset message has a predetermined format, and the preset message comprises a prompt message and an entrance identifier;
   receiving a triggering operation on the entrance identifier in the preset message;
   displaying, on the session interface, a setting interface for setting the preset function in response to receiving the triggering operation on the entrance identifier, wherein displaying, on the session interface, the setting interface comprises overlaying the setting interface on a partial area of the session interface; and
   in response to a setting operation for the preset function performed in the setting interface for setting the preset function, setting the preset function of the client associated with the first user.

2. The session method according to claim 1, wherein the user input performed on the entrance identifier in the preset message comprises a preset gesture operation.

3. The session method according to claim 1, wherein the setting the preset function of the client associated with the first user, comprises at least one of:
   setting a session function attribute of the client of the first user; or
   setting an application function attribute and/or a system function attribute of the client of the first user.

4. The session method according to claim 3, wherein the session function attribute comprises one or more of:
   a background of the session interface, a presentation form of a session message, or a function control associated with a session.

5. The session method according to claim 4, wherein the setting a session function attribute associated with the client of the first user comprises one or more of:
   setting the background of the session interface, by entering an interface for setting the background of the session interface through the preset message;
   setting the presentation form of the session message, by entering an interface for setting the presentation form of the session message through the preset message; or
   setting the function control associated with the session, by entering an interface for setting the function control associated with the session through the preset message.

6. The session method according to claim 5, wherein the setting the function control associated with the session comprises one or more of:
   adding the function control associated with the session;
   deleting the function control associated with the session; or
   adjusting a position of the function control associated with the session.

7. The session method according to claim 3, wherein:
   the application function attribute comprises an application configurable function attribute and/or an application setup attribute; and
   the system function attribute comprises a system configurable function attribute and/or a system setup attribute.

8. The session method according to claim 1, wherein:
   the preset message comprises a configuration information identifier which corresponds to configuration information sent from the second user for the preset function of the client of the first user; and
   in response to an operation triggered based on the configuration information identifier, the preset function of the client of the first user is set according to the configuration information.

9. The session method according to claim 8, wherein the in response to an operation triggered based on the configuration information identifier, the preset function of the client of the first user is set according to the configuration information, comprises:
   in response to an operation of triggering the configuration information identifier, displaying a first control; and
   in response to an operation of triggering the first control, setting the preset function of the client of the first user according to the configuration information, so that the client of the first user currently sets the preset function corresponding to the configuration information.

10. The session method according to claim 8, further comprising:
    in response to a preset condition being met, displaying a second control on the session interface; and
    in response to an operation for triggering the second control, configuring the client of the first user to set the preset function from a current time with the configuration information sent from the client of the second user by default.

11. The session method according to claim 1, wherein:
    the preset message comprises a configuration information identifier which corresponds to configuration information of the second user for a preset function of a client of the second user; and
    in response to an operation triggered based on the configuration information identifier, the preset function of the client of the first user is set according to the configuration information, so that the first user and the second user share a same setting of the preset function.

12. The session method according to claim 1, further comprising:
    displaying a preset control on the session interface, the preset control being configured to send the preset message in response to being triggered.

13. An electronic device, comprising:
    one or more processors; a storage device configured to store one or more programs, which, when executed by the one or more processors, cause the one or more processors to implement operations comprising:
    receiving a preset message sent from a second user to the first user, wherein the preset message is sent to the first user by the second user triggering a preset control;
    displaying the preset message in an area of displaying messages on the session interface, wherein the preset message is configured to prompt the first user to set a preset function, the preset message has a predetermined format, and the preset message comprises a prompt message and an entrance identifier;
    receiving a triggering operation on the entrance identifier in the preset message;

displaying, on the session interface, a setting interface for setting the preset function in response to receiving the triggering operation on the entrance identifier, wherein displaying, on the session interface, the setting interface comprises overlaying the setting interface on a partial area of the session interface; and in response to a setting operation for the preset function performed in the setting interface for setting the preset function, setting the preset function of the client associated with the first user.

14. A non-transitory computer-readable storage medium having stored thereon a computer program which, when executed by a processor, causes the processor to implement operations comprising:

receiving a preset message sent from a second user to the first user, wherein the preset message is sent to the first user by the second user triggering a preset control;

displaying the preset message in an area of displaying messages on a session interface, wherein the preset message is configured to prompt the first user to set a preset function, the preset message has a predetermined format, and the preset message comprises a prompt message and an entrance identifier;

receiving a triggering operation on the entrance identifier in the preset message;

displaying, on the session interface, a setting interface for setting the preset function in response to receiving the triggering operation on the entrance identifier, wherein displaying, on the session interface, the setting interface comprises overlaying the setting interface on a partial area of the session interface; and in response to a setting operation for the preset function performed in the setting interface for setting the preset function, setting the preset function of the client associated with the first user.

15. The non-transitory computer-readable storage medium according to claim 14, wherein the user input performed on the entrance identifier in the preset message comprises a preset gesture operation.

16. The non-transitory computer-readable storage medium according to claim 14, wherein the setting the preset function of the client associated with the first user, comprises at least one of:

setting a session function attribute of the client of the first user; or setting an application function attribute and/or a system function attribute of the client of the first user.

17. The non-transitory computer-readable storage medium according to claim 16, wherein the session function attribute comprises one or more of:

a background of the session interface, a presentation form of a session message, or a function control associated with a session.

18. The non-transitory computer-readable storage medium according to claim 17, wherein the setting a session function attribute of the client associated with the first user comprises one or more of:

setting the background of the session interface, by entering an interface for setting the background of the session interface through the preset message;

setting the presentation form of the session message, by entering an interface for setting the presentation form of the session message through the preset message; or setting the function control associated with the session, by entering an interface for setting the function control associated with the session through the preset message.

19. The non-transitory computer-readable storage medium according to claim 18, wherein the setting the function control associated with the session comprises one or more of:

adding the function control associated with the session;

deleting the function control associated with the session; or adjusting a position of the function control associated with the session.

\* \* \* \* \*